US010866863B1

(12) United States Patent
Whitmer et al.

(10) Patent No.: US 10,866,863 B1
(45) Date of Patent: Dec. 15, 2020

(54) DISTRIBUTED MODEL FOR DATA INGESTION

(71) Applicant: EMC Corporation, Hopkinton, MA (US)

(72) Inventors: Ray David Whitmer, Pleasant Grove, UT (US); Ajit Kumar Verma, Pleasant Grove, UT (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 928 days.

(21) Appl. No.: 15/195,362

(22) Filed: Jun. 28, 2016

(51) Int. Cl.
G06F 16/00 (2019.01)
G06F 11/14 (2006.01)

(52) U.S. Cl.
CPC ...... G06F 11/1464 (2013.01); G06F 2201/84 (2013.01)

(58) Field of Classification Search
CPC .................. G06F 11/1464; G06F 2201/84
USPC ......................................... 707/654
See application file for complete search history.

(56) References Cited

U.S. PATENT DOCUMENTS

| 5,592,661 | A | 1/1997 | Eisenberg |
| 6,356,916 | B1 | 3/2002 | Yamatari et al. |
| 7,680,830 | B1 | 3/2010 | Ohr |
| 8,099,572 | B1* | 1/2012 | Arora ...................... G06F 13/28 707/640 |
| 8,352,431 | B1* | 1/2013 | Protopopov .......... G06F 16/128 707/640 |
| 8,510,271 | B1 | 8/2013 | Tsaur |
| 8,566,297 | B1 | 10/2013 | Dowers et al. |
| 9,189,414 | B1* | 11/2015 | Shim ....................... G06F 12/08 |
| 9,250,891 | B1 | 2/2016 | Beranek et al. |
| 9,811,459 | B1 | 11/2017 | Allen |
| 2004/0167898 | A1 | 8/2004 | Margolus |
| 2005/0203969 | A1 | 9/2005 | Kawabe |
| 2007/0061385 | A1 | 3/2007 | Clark |
| 2007/0073791 | A1 | 3/2007 | Bruce |
| 2007/0233828 | A1 | 10/2007 | Gilbert |
| 2008/0162595 | A1* | 7/2008 | Kushwah ............ G06F 11/1471 |
| 2009/0125572 | A1 | 5/2009 | Cannon |
| 2009/0248757 | A1 | 10/2009 | Havewala |
| 2009/0307236 | A1 | 12/2009 | Kramer |
| 2011/0010700 | A1 | 1/2011 | Lanner et al. |

(Continued)

OTHER PUBLICATIONS

U.S. Appl. No. 15/194,871, filed Jun. 28, 2016, Whitmer, et al.

(Continued)

Primary Examiner — Monica M Pyo
(74) Attorney, Agent, or Firm — Workman Nydegger

(57) ABSTRACT

In one example, a method for a distributed model of data ingestion includes receiving multiple asynchronous backup requests from a plurality of clients, and performing primary processing with respect to data elements of a first one of the backup requests. Next, a job concerning a secondary process is added to a job queue. A handoff is then made for performance of the secondary processing with respect to data elements of the first backup request. The job is then accessed and the secondary processing is performed with respect to the data elements of the backup request, wherein the primary processing and secondary processing are respective first and second stages of an ingestion process, and the primary processing is performed prior to the secondary processing.

18 Claims, 5 Drawing Sheets

(56) References Cited

U.S. PATENT DOCUMENTS

| | | | |
|---|---|---|---|
| 2012/0078896 A1 | 3/2012 | Nixon et al. | |
| 2012/0303587 A1* | 11/2012 | Kushwah | G06F 16/10 707/654 |
| 2014/0025641 A1 | 1/2014 | Kumarasamy | |
| 2014/0181027 A1 | 6/2014 | Whitehead | |
| 2014/0181041 A1 | 6/2014 | Whitehead | |
| 2015/0032698 A1 | 1/2015 | Cochrane | |
| 2015/0039849 A1 | 2/2015 | Lewis | |
| 2015/0227538 A1 | 8/2015 | Rambacher | |
| 2016/0012070 A1 | 1/2016 | Aggarwal | |
| 2016/0070717 A1 | 3/2016 | Bergner | |
| 2017/0124220 A1 | 5/2017 | Krueger et al. | |

OTHER PUBLICATIONS

U.S. Appl. No. 15/195,197, filed Jun. 28, 2016, Whitmer, et al.
U.S. Appl. No. 15/195,469, filed Jun. 28, 2016, Whitmer, et al.
U.S. Appl. No. 15/195,574, filed Jun. 28, 2016, Whitmer, et al.
U.S. Appl. No. 15/194,871, dated Jan. 31, 2019, Final Office Action.
U.S. Appl. No. 15/195,197, dated Apr. 15, 2019, Final Office Action.
U.S. Appl. No. 15/195,469, dated Apr. 29, 2019, Final Office Action.
U.S. Appl. No. 15/194,871, dated May 8, 2019, Office Action.
U.S. Appl. No. 15/195,469, dated Oct. 1, 2018, Office Action.
U.S. Appl. No. 15/195,197, dated Oct. 12, 2018, Office Action.
U.S. Appl. No. 15/194,871, dated Jun. 27, 2018, Whitmer, et al.
U.S. Appl. No. 15/195,197, dated Jul. 30, 2019, Final Office Action.
U.S. Appl. No. 15/195,469, Aug. 29, 2019, Office Action.
U.S. Appl. No. 15/195,574, Dec. 31, 2019, Office Action.
U.S. Appl. No. 15/195,469, Feb. 4, 2020, Office Action.
U.S. Appl. No. 15/195,197, Mar. 12, 2020, Office Action.
U.S. Appl. No. 15/195,871, Apr. 15, 2020, Office Action.
U.S. Appl. No. 15/195,197, Oct. 25, 2020, Office Action.
U.S. Appl. No. 15/195,469, Jul. 10, 2020, Office Action.

* cited by examiner

DISTRIBUTED MODEL FOR DATA INGESTION

RELATED APPLICATIONS

This application is related to: U.S. patent application Ser. No. 15/194,871, entitled CATALOG VIEWS, and filed the same day herewith; U.S. patent application Ser. No. 15/195,197, entitled POINT IN TIME MODEL FOR BACKUP TIMELINES, and filed the same day herewith; U.S. patent application Ser. No. 15/195,469, entitled RECLAMATION AND RECONCILIATION IN A STORAGE ENVIRONMENT, and filed the same day herewith; and, U.S. patent application Ser. No. 15/195,574, entitled STRONG REFERENCING BETWEEN CATALOG ENTRIES IN A NON-RELATIONAL DATABASE, and filed the same day herewith. All of the aforementioned applications are incorporated herein in their respective entireties by this reference.

FIELD OF THE INVENTION

Embodiments of the present invention generally concern implementation and management of processes concerning data backup. More particularly, at least some embodiments of the invention relate to systems, hardware, computer-readable media, and methods directed to data ingestion and processing in a storage environment.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

While there is little question about the need to back up important data, the ongoing accumulation of multiple versions of one or more files or other objects, as well as other considerations, can result in the transmission and storage of a vast amount of data. Such large amounts of data can overwhelm conventional data storage and processing systems. For example, processing of catalog entries for the incoming data is typically a stateless process that is performed on-the-fly as the data is received by the backup system. However, performing this processing on-the-fly can significantly slow the intake process.

To further illustrate some of the problems with current stateless approaches, it may be desirable to perform a variety of processes with respect to the incoming data. However, the entity receiving that data often has limited contextual information and other metadata that is needed to provide insights as to what processing should be performed. Thus, the receiving entity may have to query the incoming data to obtain this contextual information. The query process, and subsequent application of any implicated data processes, may significantly slow the rate at which the data is ingested into the backup system.

Another concern with some backup systems and processes relates to the nature of the databases that are used to store the incoming data and metadata. In particular, many of such databases are configured to provide immediate data consistency so that any queries directed to storage can be assured of receiving all possible results. However, establishing such data consistency in the backup database(s) slows down the ingestion process because it requires that the client, or clients, transmitting data to the backup system first complete all their processes, since processes that are still running may result in an inconsistent state in the database.

Yet another problem with some systems and approaches to data ingestion concerns the backup data streams generated by the clients and transmitted to the backup systems. In particular, each client of a backup system or backup service may be running a variety of different processes. These backup processes can overlap each other both in the time space and also with regard to the objects to which the processes are directed. By way of illustration, one or more clients may be running multiple processes, which may have no awareness of each other, that result in the creation of two different versions of an object, both of which are slated by their respective processes for storage. To further complicate matters, the different versions may arrive at the backup system out of order. For example, the relatively older version of the object may arrive at the backup system before the newer version of the object arrives. Thus, any processes performed by the backup system may be performed on the older version of the object, rather than on the most recent version of the object.

As the foregoing examples make clear, typical backup processes and systems are problematic at least in that they may operate at a rate that is unacceptably slow. Moreover, the processing of the backup data by typical backup processes and systems may be prone to inaccuracies and/or a lack of completeness.

Accordingly, it would be useful to be able to provide data ingestion systems and/or processes that are able to provide processing of incoming backup data without materially slowing the data ingestion process. As well, it would be useful to provide data ingestion systems and/or processes that are operable in connection with a wide variety of processes, such as data storage requests, some of which may be overlapping and/or interleaved.

DESCRIPTION OF THE FIGURES

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
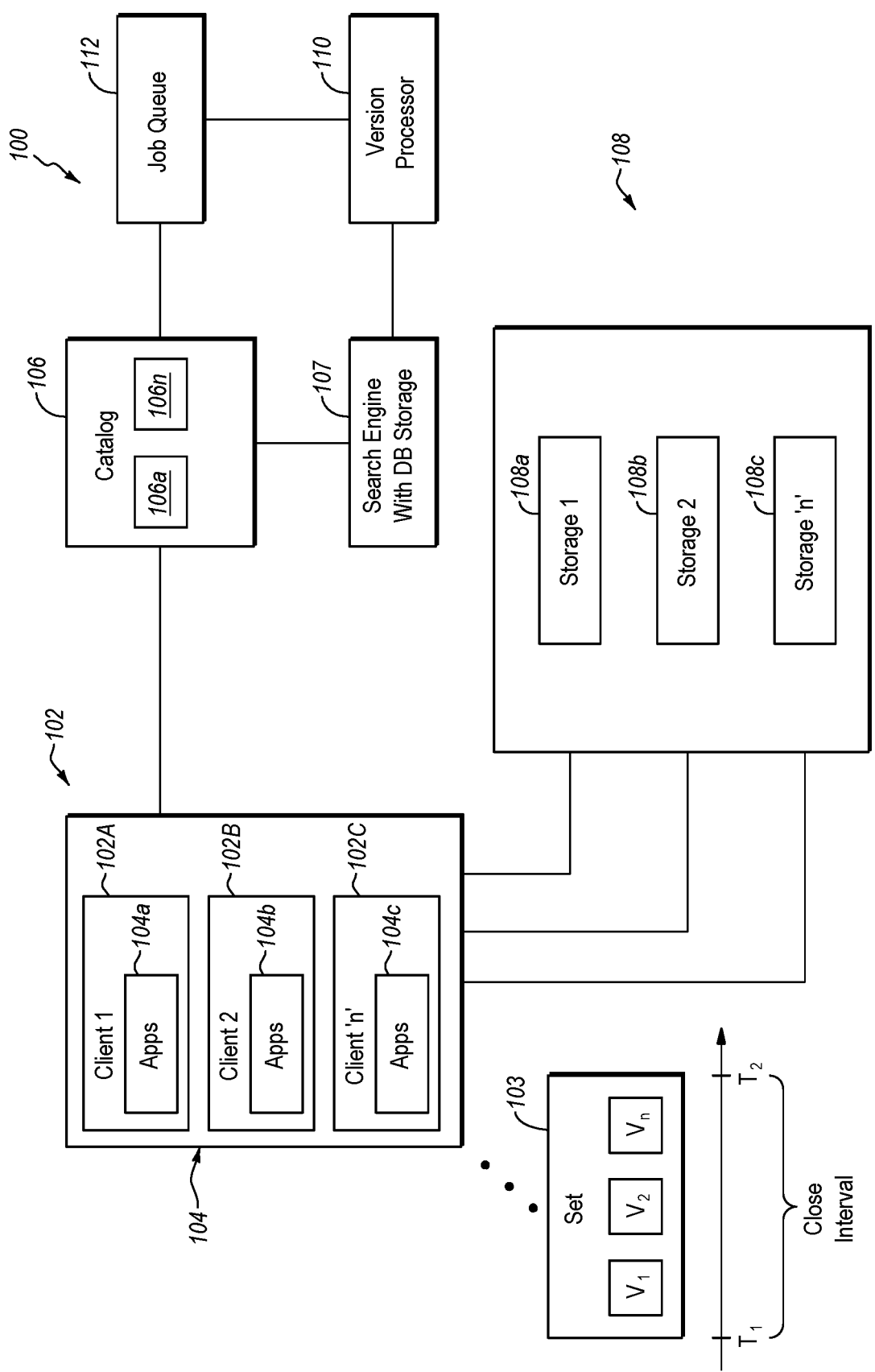
FIG. 1 is directed to aspects of a first example operating environment for at least some embodiments.

Embodiments of the present invention generally concern implementation and management of processes concerning data backup. More particularly, at least some embodiments of the invention relate to systems, hardware, computer-readable media, and methods directed to data ingestion and processing in a storage environment. Embodiments of the invention can be employed, for example, in connection with back up data targeted for storage in a cloud storage environment, but the scope of the invention is not limited to such applications and environments. For example, yet other embodiments can be performed in connection with an on-premises storage environment, such as may be located at an enterprise site.

Embodiments of the invention can be employed in connection with any type of data. As used herein, the terms 'data' and 'data element' are intended to be construed broadly and embrace, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data. Likewise, the term 'metadata' as used herein is intended to be broad in scope and embraces, at least, any information about any of the types of data disclosed herein. Examples of metadata include, but are not limited to, information about a data element such as the version, creation date, and expiration date.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and later restoration.

In connection with the examples noted immediately below, as well as the examples disclosed elsewhere herein, it should be noted that the use of the term 'object' is employed simply as a convenient way to illustrate aspects of embodiments of the invention. However, the scope of the invention is not limited to the use of objects nor to any other particular form, group, set, combination or string, of data or data element.

In some example embodiments of the invention, multiple backup requests, or simply requests, are received by a backup storage system from one or more clients. Each of the requests can identify versions of a variety of different data elements that are requested to be stored, and each version may be associated with, or otherwise implicate, a corresponding entry in a version listing of a catalog in the backup storage system. In this way, the version listing of the catalog can include a listing of all versions of all data elements stored, or that will be stored, in storage. The actual data with which the version information is associated may be stored in storage separately from the version information and other metadata.

As the requests come into the backup storage system, a data ingestion process is performed in which processing of the incoming catalog entries is split amongst two or more entities. Depending upon the embodiment, one entity can be subsumed within another, or two entities may be separate from each other. In one example embodiment, one of the entities is a catalog, and the other entity is a version processor, although additional or alternative entities could be employed. For the purposes of illustration, reference may be made herein to the catalog and version processor examples. The catalog can be part of a system in which the catalog serves as a system front end by way of which incoming catalog entries and other metadata are received, and a search engine that communicates with the catalog and serves as a system back end.

In general, an approach in which processing of catalog entries is split between or amongst two or more entities may be referred to herein as a two state process or multi state process. In at least some embodiments, the catalog directs and/or implements the initial processing of the incoming catalog entries, and subsequent processing of the catalog entries is performed by and/or at the direction of a version processor. These initial processing and subsequent processing processes may be referred to herein as primary processing and secondary processing, respectively, which occur at a primary processing stage and as secondary processing stage, respectively.

As a result of this split of the processing workload, the backup system can ingest data at a relatively high rate, while still timely implementing the necessary processing of the ingested data. In one particular example, the catalog may perform such initial processes as indexing the catalog entries as they are received at the front end, data quality checks, view transformations, synchronization of versions, and serialization of versions.

Subsequently, or at about the same time that the catalog performs its initial processing concerning the incoming catalog entries, the version processor can perform additional processing concerning those catalog entries, examples of which include computation of version expiration times, and/or application of expiration policies to versions of data elements. The processing to be performed by the version processor can take the form of one or more jobs identified in a job queue created by the catalog and accessible by the version processor. Because, in some embodiments, the catalog cannot directly access the storage, identification of operations by the catalog and/or version processor, such as deletion of an object version from storage, is carried out by an intermediary, such as a service for example, that is able to communicate with both the catalog and the storage.

Advantageously then, multi state data ingestion processes such as are disclosed herein can enable relatively high rates of data ingestion, while also implementing necessary processing with respect to the ingested data. As a result, the processes and systems disclosed herein are able to operate effectively in conjunction with backup data streams that may, for example, be asynchronous relative to each other in temporal terms and/or in terms of the data in the different respective streams. Thus, although the systems and processes disclosed herein may appear to be counter-intuitive, at least insofar as some of the processing of catalog entries is divided amongst multiple entities rather than being performed by a single entity, and some processing may not be immediately performed with respect to the incoming catalog entries, various useful results may nonetheless be achieved.

A. Example Operating Environment

In general, embodiments of the invention may include and/or be implemented in an operating environment that includes various clients and/or other devices that generate and/or cause the generation of data that is backed up at a cloud storage site and/or other site. In at least some embodiments of the invention, any of the methods disclosed herein can be performed in whole or in part at a cloud storage site, although that is not necessarily required.

As used herein, the term 'client' is intended to have broad scope and embraces, among other things, any system, device, or combination of those, by way of which access, whether direct or indirect, to cloud based storage can be achieved. As such, one or more clients may be in a cloud system, and/or one or more clients may be located at a customer site.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. In other embodiments, some, or all, of the elements of the operating environment 100 can reside on-premises at an enterprise. The operating environment 100 may include various devices including servers and other computers that are interconnected. The operating environment 100 may employ a variety of communication media, such as hardwire, optical, wireless, or some combination thereof. Unless otherwise indicated, communication between entities indicated as connected can be unidirectional, or bidirectional.

As indicated in FIG. 1, the example operating environment 100 may include one or more clients 102, such as clients 102a, 102b, and 102c for example. Among other things, the clients 102 may host, or otherwise employ, one or more applications 104, such as application groups 104a, 104b, and 104c, respectively. The applications 104, which can be any type of application, may generate, and/or cause the generation of, data and associated metadata that is desired to be stored, such as in the form of a backup for example, and that can be used to restore data to the clients 102. The metadata generated by and/or at the direction of the clients 102 can be transmitted to a catalog 106 as part of a backup process, although other processes could be used to transmit such metadata from the clients 102 to the catalog 106. The data with which the metadata is associated can be transmitted by the clients 102 to storage 108, discussed in more detail below. The metadata can include, but is not limited to, catalog entries associated with the data that is to be backed up.

One of the applications 104 on one or more of the clients 102 may be a backup client that can cooperate with a backup application on a backup server (not shown) to generate one or more backups of the client(s) 102 for storage and subsequent restoration. Examples of such backup servers include, but are not limited to, the EMC Avamar server, and the EMC NetWorker server.

With continued reference to FIG. 1, and as noted earlier herein, the example operating environment 100 includes a catalog 106 that includes metadata concerning stored data in the storage 108. In general, the functionality of the catalog 106 may be provided by an associated catalog service. The storage 108 can take any form and may be configured to receive and store data without requiring explicit synchronization.

The metadata stored in the catalog 106 can include any type or combination of metadata relating in any way to any type of stored data. In at least some embodiments, the catalog 106 includes metadata such as version information concerning a stored object or other data element. Such metadata can be received by the catalog 106 from one or more clients 102, and the catalog 106 can include respective metadata associated with each of several different backup targets.

The catalog 106 may be a centralized catalog that includes one or more application-specific catalogs 106a . . . 106n within it. Each of the application-specific catalogs may be associated with a particular type, or types, of data. The version metadata can be stored in the catalog 106 as a list, although that is not required. For example, the catalog 106 can include an index or list of the versions of an object, or objects, that are stored in storage 108, discussed below. The version listing may also include information concerning the physical storage location of the data associated with items in the version list.

The metadata in the catalog 106 may relate to a variety of different objects, each of which can be associated with a different respective application. Thus, the catalog 106 may, in some embodiments, be characterized as application-agnostic in that the catalog 106 is not limited to storing metadata associated with a single application but, instead, can include metadata generated by, and/or in connection with, a variety of different applications. Correspondingly, the metadata stored in catalog 106 can relate to any number of different storage locations in storage 108. In at least some embodiments, the catalog 106 only stores metadata, while the object(s) or other data elements with which that metadata are associated are stored separately from the metadata, such as in storage 108 discussed below. Some embodiments of the catalog 106 take the form of a cloud centralized catalog, although that is not required, and the catalog 106 need not be a cloud-based entity. Finally, the catalog 106 can include, or otherwise be associated with, a search engine 107, such as the 'Elastic Search' engine for example. Among other things, the search engine 107 can operate to perform searches of version information and other metadata stored at the catalog 106.

As further indicated in FIG. 1, and noted earlier, the operating environment 100 can include storage 108, such as storage 108a, 108b, and 108c, in which data generated by and/or at the direction of one or more of the clients 102 is stored. In general, the storage 108 stores the data to which the metadata contained in the catalog 106 relates.

The storage 108 can be any type, or type(s) of storage. Examples of storage 108 include, but are not limited to, network drives, appliances such as the EMC CloudBoost appliance, and cloud-based storage such as the Amazon Simple Storage Service (S3). As these examples illustrate, the storage 108 in a the example operating environment 100 can include one, or both, of on-premises storage such as network drives and appliances, and off-premises storage such as the S3 storage. Accordingly, the scope of the invention is not limited to any particular type or location of storage 108.

For security purposes and/or other reasons, the storage 108 in some embodiments is not accessible by the catalog 106 and, likewise, the catalog 106 is not accessible by the storage 108. While, in some embodiments at least, neither the catalog 106 nor the storage 108 is accessible by the other, the storage 108 and catalog 106 may nonetheless be visible to each other, that is, one of both of these entities may be aware of the presence or existence of the other. In other embodiments, neither the storage 108 nor the catalog 106 is visible to the other. In any case, arrangements of the catalog 106 and the storage 108 such as those just described help to maintain separation of data and its associated metadata, since the data is stored in the storage 108, while the metadata associated with the data in storage 108 is stored in the catalog 106.

The example operating environment 100 may further include a version processor 110. The version processor 110 may access a job queue 112 that is controlled by the catalogue 106. In general, and as discussed elsewhere herein, the version processor 110 can perform various processes with respect to data corresponding to catalog entries received by the catalog 106 from one or more of the clients 102. As indicated in the example of FIG. 1, such client 102 data can take, for example, the form of one or more sets 103, each of which may include multiple versions V1 . . . Vn of various objects or other data elements, and each of the versions V may be associated with a respective catalog entry. The catalog entries can be created by the client, or by the catalog. Each set 103 can be associated with a close interval that has an open time T1 and a close time T2. Further details concerning such sets 103 are provided elsewhere herein.

B. Example Catalog and Clients

Figure 2:
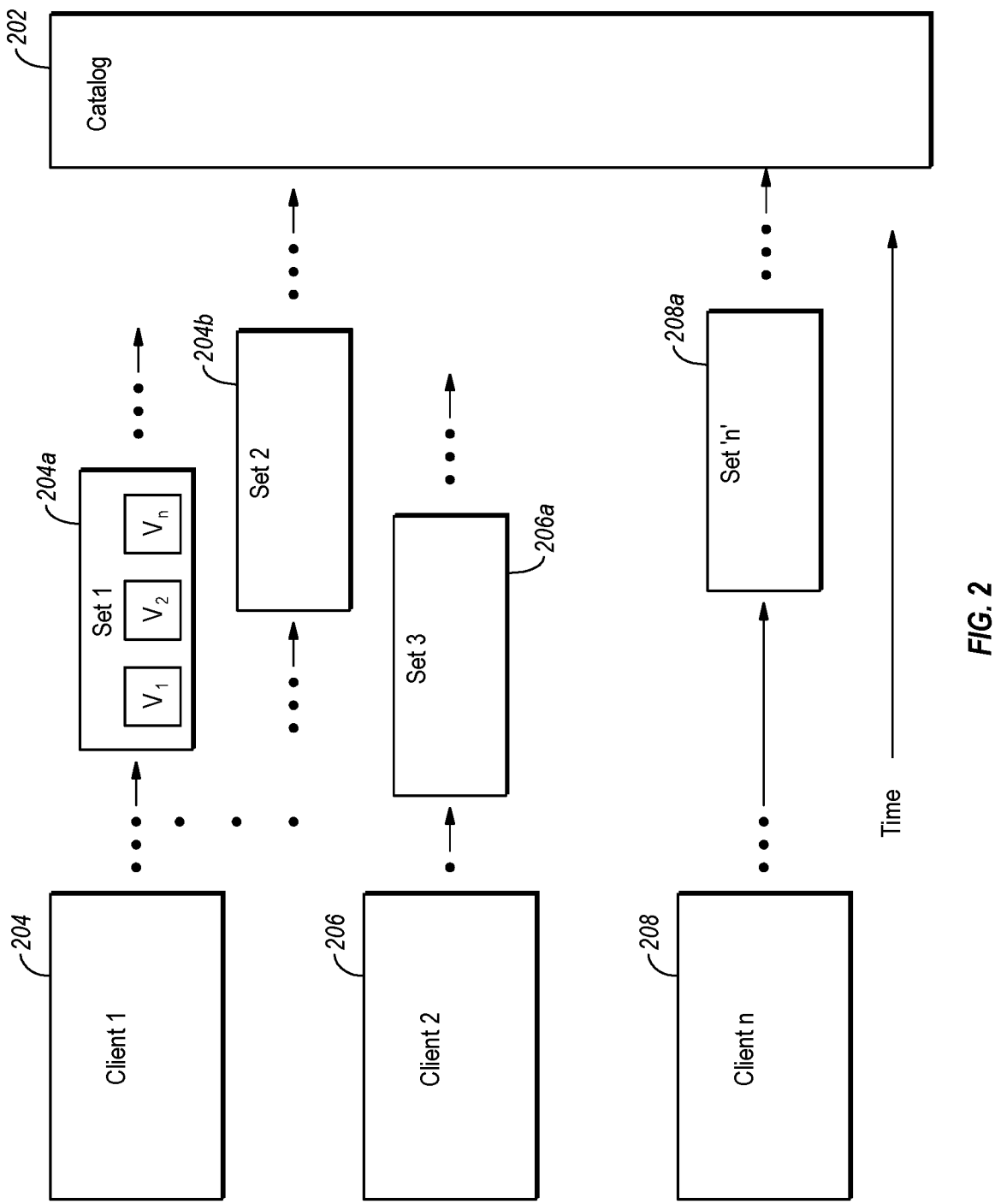
FIG. 2 is directed to an example arrangement and configuration of a catalog and one or more clients.

With reference now to FIG. 2, details are provided concerning an example catalog 202 and its interaction with 1 . . . n clients 204, 206 and 208. In general, the clients 204 . . . 208 may be similar, or identical, to any of clients 102a . . . 102c of FIG. 1, although that is not required. Each of the clients 204 . . . 208 may generate backup data and associated metadata. The combined backup data and associated metadata can take the form of one or more sets, such as sets 204a, 204b, 206a, and 208a. Thus, the sets can include data elements that have changed in some way relative to a prior backup, and the objects or other data elements in the set can be backed up as a group. As indicated in the example of set 204a, metadata in that set may identify one or more versions V1 . . . Vn of one or more data elements of that set. In one illustrative example, a set can comprise the contents of a folder, but the scope of this disclosure is not limited to that example, and a set can comprise any other grouping or form of data.

Each of the sets 204a, 204b, 206a, and 208a can remain open for a period of time that can be specified, for example, by the client 204 . . . 208. This period of time may be referred to herein as a close interval, and each set 204a . . . 208a can have a different close interval, although in some instances, one or more sets may have the same close interval. In at least some instances, a set can be application-specific, although that is not required, and a set can span multiple different applications. Typically, a set is held open by the client generating the set so that the set can accept information concerning new versions of a data element. The close interval can be lengthened or shortened by the client whose data is the subject of that close interval. However, the close interval can be thought of as a transaction so that, for example, even if new data and metadata are added to the set after the close interval has shortened, that new data and metadata will remain part of the set. The end of the close interval corresponds to the time that the client closes the set, and once the set has been closed, neither the set nor the catalog will accept new versions of data elements.

As generally indicated by the example of FIG. 2, a backup storage system, which includes a catalog 202, may operate in connection with multiple asynchronous events. For example, the backup storage system may be receiving various types and amounts of data, from a variety of different sources, at various times. In more detail, the backup storage system may receive one or more sets which can overlap with each other in the time space and/or in terms of the objects or data elements that they include. This overlap can occur between clients and/or within a single client. As well, the close interval and content can vary from one set to another, and the open and close times can vary from one set to another. As these examples illustrate, the backup storage system must be flexible enough to operate in an environment with a wide variety of constantly changing conditions, over which the backup storage system, including the catalog and version processor, has little or no control.

In more detail, the catalog 202 performs some initial processing concerning backup requests received by the backup storage system. For example, the catalog 202 may index catalog entries as they are received by updating its version listing to reflect that new versions of one or more data elements have been received by the backup storage system. The catalog 202 can also perform basic data quality checks, and can implement view transformations. As well, the catalog 202 can perform processes that will put the catalog entries in better condition for subsequent processing, where such processes can include synchronization of versions and serialization of versions in the catalog 202.

This initial processing by the catalog 202 may not be performed for a particular set, for example, until the catalog 202 is made aware by the client 204 . . . 208 that the set 204a . . . 208a has been closed. This information provides assurance to the catalog 202 that no further changes to the set 204a . . . 208a will be made and the catalog 202 can perform the initial processing with regard to the versions in the set 204a . . . 208a without creating inconsistent states or other problems. Any changes outside the close interval can be handled by the catalog 202 at another time.

C. Example Version Processor

Figure 3:
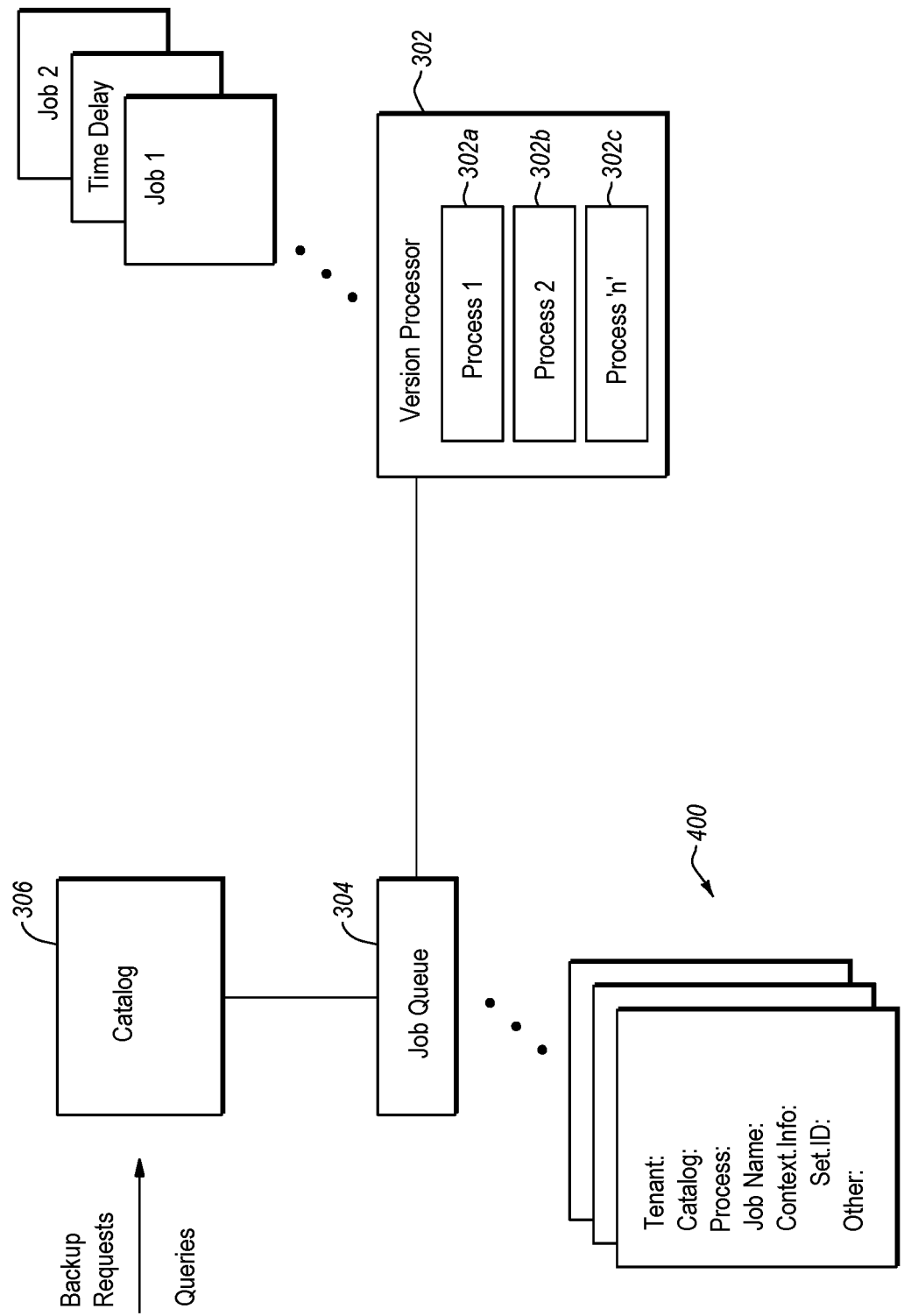
FIG. 3 is directed to an example arrangement and configuration of a catalog and version processor.

Turning now to FIG. 3, details are provided concerning example implementations of a version processor, one particular example of which is denoted at 302 and includes one or more modules 1 . . . n, denoted at 302a, 302b and 302c. Each of the modules 302a . . . 302c can perform, or cause the performance of, a particular process or group of processes. As further indicated, the version processor 302 may communicate with a job queue 304 that is controlled and maintained by a catalog 306. When the catalog 306 has completed the initial processing, examples of which are noted above, the sets are then made available by the catalog 306 to the version processor 302 for further processing.

In more detail, the use of sets and close intervals enables the definition of discrete jobs by the catalog 306, where each job is specific to a particular set and identifies additional processing to be performed once the initial processing by the catalog 306 has been completed. The jobs can be added by the catalog 306 to the job queue 304. The version processor 302 can then access the job queue 304 and perform secondary processing on the set identified in the next job. In at least some embodiments, the version processor 302 performs each job in the order in which that job was received in the job queue 304 from the catalog 306.

In general, the version processor 302 is a stateless machine, process, or service. Thus, the version processor 302 can perform multiple jobs at once, and each of the modules 1 . . . n can perform a particular process or function concerning the set identified for a particular job. Because the storage (see 108, FIG. 1) may be configured such that it does not require explicit synchronization, the jobs can be performed without imposing any significant processing overhead on the storage or on the clients whose data is being processed.

Some of the processes that can be performed by the version processor 302 in connection with one or more jobs of the job queue 304 include, but are not limited to, computing an end time for one or more versions of a data element based on the start time of the next version to track currency of versions, applying an expiration policy to a data element, tracking versions to determine when they have expired and then queueing or marking expired versions for garbage collection, and identifying strong references between catalog entries.

In addition to the foregoing example processes, the version processor 302 can perform various bulk operations. For example, the version processor 302 can perform bulk deletions of a group of version entries from the catalog 306. In particular, the version processor 302 can mark an entire catalog as deleted, and then clear the associated job. As another example, the version processor 302 can perform bulk updates to one or more version entries of the catalog 306.

When a job regarding a set is completed by the version processor 302, the version processor 302 can set a flag so that a query of the database will return the flag and the querying entity thus made aware that processing has been completed with regard to that set. Following is an example use case that involves the setting of such a flag.

In this example, a time-based query, that is, a query that requests certain data as that data existed as of a particular time, may be received at the backup storage system at the same time as backup data is being transmitted to the backup storage system. However, processing of all of the data identified in the query may not have been completed by the version processor 302 at the time of the query. For example, an end time may not yet have been assigned to some of the versions embraced by the query. Thus, the version processor 302 may respond to the query by returning only those versions embraced within the query whose processing has been completed. That is, the version processor 302 may respond as if such versions were not yet present at the backup storage system. This result can be specified by the query, that is, the query can specify that the version processor 302 not return any version information for data elements for which a flag has not been set. In another example, the query can specify that all version information be returned, regardless of whether processing for all versions has been completed or not, that is, whether or not a flag has been set for all versions.

As is further apparent from FIG. 3, the split of the data ingestion processing workload between entities such as the catalog 306 and the version processor 302 can provide still other benefits. As one example, the version processor 302 can inject a 'cooling off' period, or time delay, before performance of a job, such as Job 2, and/or between performance of two jobs, such as Job 1 and Job 2. This cooling off period can provide time needed for various entities of the backup storage to reach a consistent state and, as such, can be particularly useful in environments where multiple asynchronous processes are running, examples of which are disclosed herein. For example, a cooling off period, or time delay, can provide time for performance of processes such as set closure, serialization of versions, synchronization of versions, index updates, and other processes. Following is an example of a use case where a cooling off period may be employed.

A cooling off period may be useful in connection with a deletion process. For example, absent a cooling off period, a catalog could be deleted while it is still being written to by one or more processes. This can occur because the index of the catalog may not be updated immediately after a set has closed. Thus, a cooling off period could be inserted after the catalog is marked for deletion so that the processes are able to finish, and the index is updated, before the catalog is deleted. This approach can help to reduce the likelihood of inconsistent states and other problems.

With continued reference to FIG. 3, at least some embodiments of the invention can provide for a standard job queue entry that provides flexibility in that it can be adapted for any particular use case. Moreover, job queue entries can be added, modified, and/or deleted, such as by an administrator for example. Examples of standard job queue entries are collectively denoted at 400. As indicated, the job queue entry 400 can include several different fields, such as 'tenant,' 'catalog,' 'process,' 'jobname,' 'context.info' (including 'set.id') and 'other.' Various jobs can then be defined by populating these various fields, and the resulting entries made available to the catalog 306 for use in defining a job queue accessible by the version processor 302.

With regard to the particular fields, the 'tenant' field can refer to a particular client, while the 'catalog' field identifies a particular catalog associated with that tenant. The 'process' field refers to the name of the process that will be performed and the 'jobname' field specifies the particular process. Some example jobnames might include 'process set' or 'delete catalog.' The 'context.info' field can include a list of properties that will be needed for performance of the particular job, where such properties can relate to the nature of the client, client applications, the data to be backed up, and metadata. The list can take the form of a .json (JavaScript Object Notation) file, although any other suitable file type could be used. The 'set.id' can be a subpart of the 'context.info' and can include, for example, information that may be needed to locate data elements using a search engine, one example of which is noted herein in the discussion of FIG. 1. Finally, the job queue entry can include, in the 'other' field, any other information or parameters that may be used in the execution of that job by the version processor 302.

D. Example Host Configuration

Figure 4:
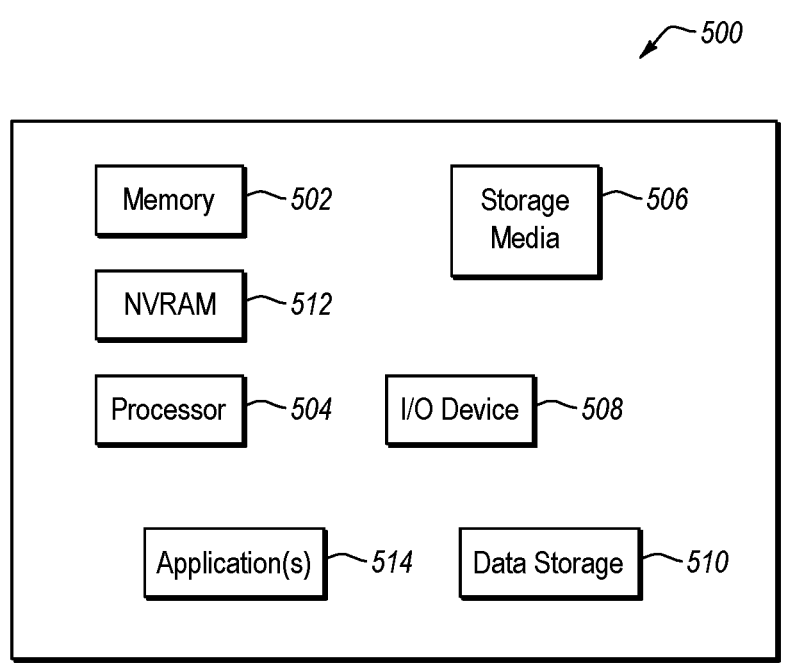
FIG. 4 is directed to an example computing device that may be employed in connection with some embodiments of the invention.

With reference briefly to FIG. 4, the catalog and/or version processor can be hosted on respective servers. In some instances, two or more of these may be hosted on a common server. In any case, such servers can consist of, comprise, or take the form of, one or more physical computing devices, one example of which is denoted at 500 in FIG. 4. In the example of FIG. 4, the computing device 500 includes a memory 502, one or more hardware processors 504, non-transitory storage media 506, I/O device 508, data storage 510, and NVRAM 512. As well, one or more applications 514 are provided that comprise executable instructions. Such executable instructions can take the form, for example, of any one or more of a catalog, and a version processor. Additional, or alternative, applications can likewise be included in the applications 514.

E. Example Data Ingestion Processes

Figure 5:
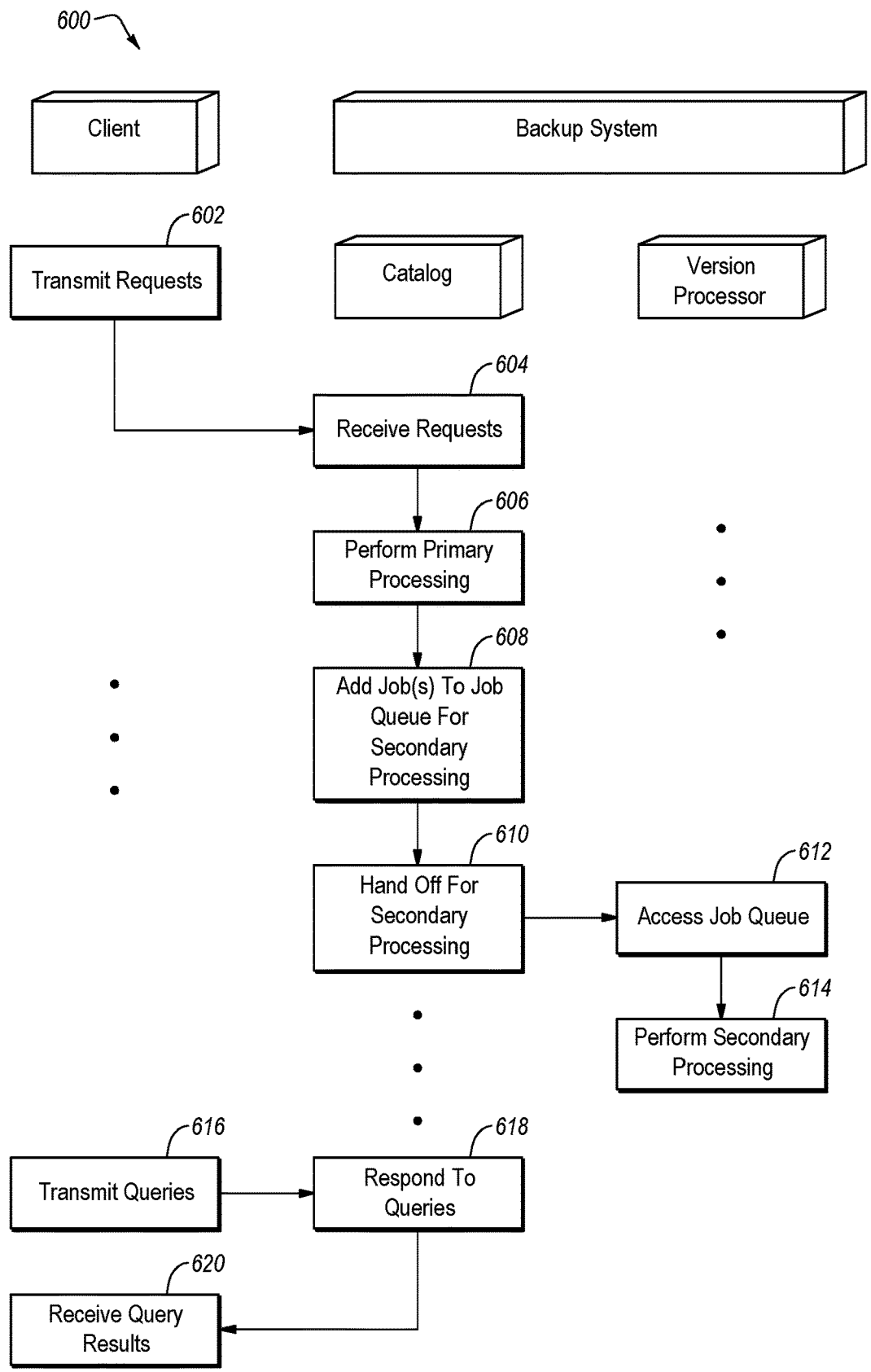
FIG. 5 is directed to example methods according to some embodiments of the invention.

With attention now to FIG. 5, details are provided concerning some example methods implemented by embodiments of the invention. One example method is denoted generally at 600. Such methods can be performed in a storage environments of various types, including cloud storage environments, or on-premises storage environments. However, the scope of the invention is not limited to performance of the disclosed methods in any particular environment or type of environment.

The method 600 can begin when one or more clients transmit backup requests 602 to a backup storage system. As noted herein, there may be a plurality of such requests, and the requests can be asynchronous in nature. As well, one or more of the requests may or may not be aware of one or more of the other requests. As such, one or more requests may be independent of one or more other requests, even though such requests may overlap in the time space and/or in terms of the data elements with which they are respectively concerned. Transmission of a request 602 can involve opening, at the client, a set that includes versions of a variety of different data elements, such as objects, that are desired to be backed up. The transmission of a particular request may continue, that is, the request may remain open, until that set is closed by the client and the backup storage system is notified that the set has been closed.

The requests are then received 604 by an entity, such as a catalog, of a backup storage system. In at least some cases, multiple requests may be received simultaneously, or substantially simultaneously, by the backup storage system. Additionally, or alternatively, one or more requests may be received 604 at the same time that other requests are still being handled by the catalog. Thus, there may be a limit as to how much processing can be performed by the catalog concerning the incoming requests without materially slowing ingestion of the data of the requests into the backup storage system. As suggested above, receipt of a particular request may be ongoing at the catalog until the catalog is notified that the set, or sets, associated with that particular request have been closed, at which point the catalog no longer accepts any changes to the closed set. Rather, changes directed to data elements of the closed set are handled in another process.

After a request has been received by the catalog, the catalog then performs primary processing 606 on the catalog entries associated with the data elements of the request. Primary processing 606 can include any one or more of indexing the catalog entries as they are received at the catalog, performing data quality checks, performing view transformations, synchronizing versions identified in the request with versions in a version list at the catalog, and serializing versions identified in the request with versions in the version list at the catalog.

At some point in the process 600, the catalog will add one or more jobs 608 to a job queue that is accessible by an entity such as a version processor of a backup storage system. In general, the job, or jobs, in the job queue collectively define the secondary processing that will be performed by the version processor with respect to the catalog entries that correspond to the data elements of a particular request. The jobs can be pushed to the version processor, or pulled by the version processor. In any case, because the secondary processing has been offloaded to the version processor and/or another entity, a relatively high speed initial ingestion at the catalog can be maintained.

Once one or more jobs corresponding to a secondary processing procedure have been placed in the job queue, the catalog can handoff 610 processing to the version processor. In some embodiments, handoff 610 does not occur until all jobs of the secondary processing have been placed in the job queue while, in other embodiments, handoff 610 can occur as soon as the first job is placed in the job queue. After handoff 610, the version processor can then access the jobs in the job queue 612.

The secondary processing can be performed 614. The secondary processing may begin as soon as the first job is placed in the job queue, or may not begin until all jobs for the secondary processing are placed in the job queue. In either case, secondary processing 614 can involve simultaneous and/or overlapping performance of multiple different jobs by the version processor. Thus, the secondary processing 614 may be a stateless process, or comprise multiple stateless processes.

Any of a variety of processes can be included in the secondary processing 614. Examples of such processes include, but are not limited to, any one or more of computing an end time for one or more versions of a data element based on the start time of the next version to track currency of versions for one or more versions of a data element, applying an expiration policy to a data element, tracking versions to determine when they have expired and then queueing or marking expired versions for garbage collection, and identifying strong references between catalog entries. Still other examples of such processes that can be included in the secondary processing 614 include bulk operations such as, but not limited to, bulk deletions of a group of version entries from the catalog, and bulk updates to one or more version entries of the catalog.

At any point before, during, or after performance of the primary processing and/or secondary processing, a query, or queries, may be transmitted 616 by the client to the backup storage system, which can then receive and respond 618 to the query, or queries. As noted in some examples herein, the query may embrace data that has not yet been processed by the backup storage system. Thus, depending upon the query and whether or not any flags have been set, the query response 618 transmitted by the backup storage system and received 620 by the client may or may not include an identification of all of the requested data.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, and engines described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:
    receiving multiple asynchronous backup requests from a plurality of clients, and each of the backup requests is associated with a respective set of catalog entries, and two or more of the backup requests overlap each other in a time space, and/or in terms of the data elements respectively identified in the backup requests;
    performing, by a catalog associated with a backup storage system, primary processing on catalog entries respectively associated with data elements of the backup requests, wherein the primary processing is a first stage of an ingestion process that also comprises secondary processing as a second stage, and the secondary processing is performed by a version processor;
    adding, by the catalog, a job to a job queue, wherein the job concerns a process that comprises a portion of the secondary processing; and
    performing, by the catalog, a handoff to the version processor for performance of the secondary processing by the version processor.

2. The non-transitory storage medium as recited in claim 1, wherein one of the backup requests remains open until an associated data set is closed by the client, and the backup storage system has been notified that the data set has been closed.

3. The non-transitory storage medium as recited in claim 1, wherein the primary processing performed by the catalog includes any one or more of indexing the catalog entries, performing data quality checks, performing view transformations, synchronizing versions identified in one of the backup requests with versions in a version list, and serializing versions identified in that backup request with versions in the version list.

4. The non-transitory storage medium as recited in claim 1, wherein one of the backup requests identifies versions of the data elements requested to be stored by the backup storage system.

5. A server, comprising:
    one or more hardware processors; and
    the non-transitory storage medium as recited in claim 1.

6. The non-transitory storage medium as recited in claim 1, wherein the operations further comprise:
    receiving, by the version processor, the handoff from the catalog;
    accessing, by the version processor, the job from the job queue; and
    performing, by the version processor, the secondary processing with respect to catalog entries respectively associated with data elements of one of the backup requests.

7. The non-transitory storage medium as recited in claim 1, wherein the job identifies a particular data set.

8. The non-transitory storage medium as recited in claim 1, wherein the secondary processing comprises one or more stateless processes.

9. The non-transitory storage medium as recited in claim 1, wherein the secondary processing comprises performing any one or more of computing an expiration time for one or more versions of one of the data elements, applying an expiration policy to a version of one of the data elements, tracking data element versions to determine when they have expired and then queueing or marking expired data element versions for garbage collection, identifying strong references between catalog entries, or performing a bulk operation regarding one or more version entries of the catalog.

10. The non-transitory storage medium as recited in claim 1, wherein the secondary processing is not performed until after the primary processing is completed.

11. The non-transitory storage medium as recited in claim 1, wherein the secondary processing comprises performance of multiple different processes that overlap in time with each other.

12. The non-transitory storage medium as recited in claim 1, wherein performance of the secondary processing overlaps with performance of the primary processing.

13. The non-transitory storage medium as recited in claim 1, wherein the operations further comprise setting, by the version processor, a flag indicating that the version processor has completed performance of the job.

14. The non-transitory storage medium as recited in claim 1, wherein the version processor injects a cooling off period before performance of the job.

15. The non-transitory storage medium as recited in claim 14, wherein the cooling off period delays performance of a deletion of the catalog until an index associated with the catalog has been updated.

16. The non-transitory storage medium as recited in claim 14, wherein the cooling off period delays performance of a deletion of the catalog until after completion of processes that require an index update.

17. The non-transitory storage medium as recited in claim 1, wherein the handoff and/or secondary processing do not take place until all jobs of the secondary processing have been placed in the job queue.

18. The non-transitory storage medium as recited in claim 1, wherein the handoff and/or secondary processing take place after the job has been placed in the job queue.

\* \* \* \* \*